Jan. 6, 1970    HIROSHI SHIMOTAKE ET AL    3,488,221
ELECTROCHEMICAL CELL
Filed Aug 8, 1967    6 Sheets-Sheet 1
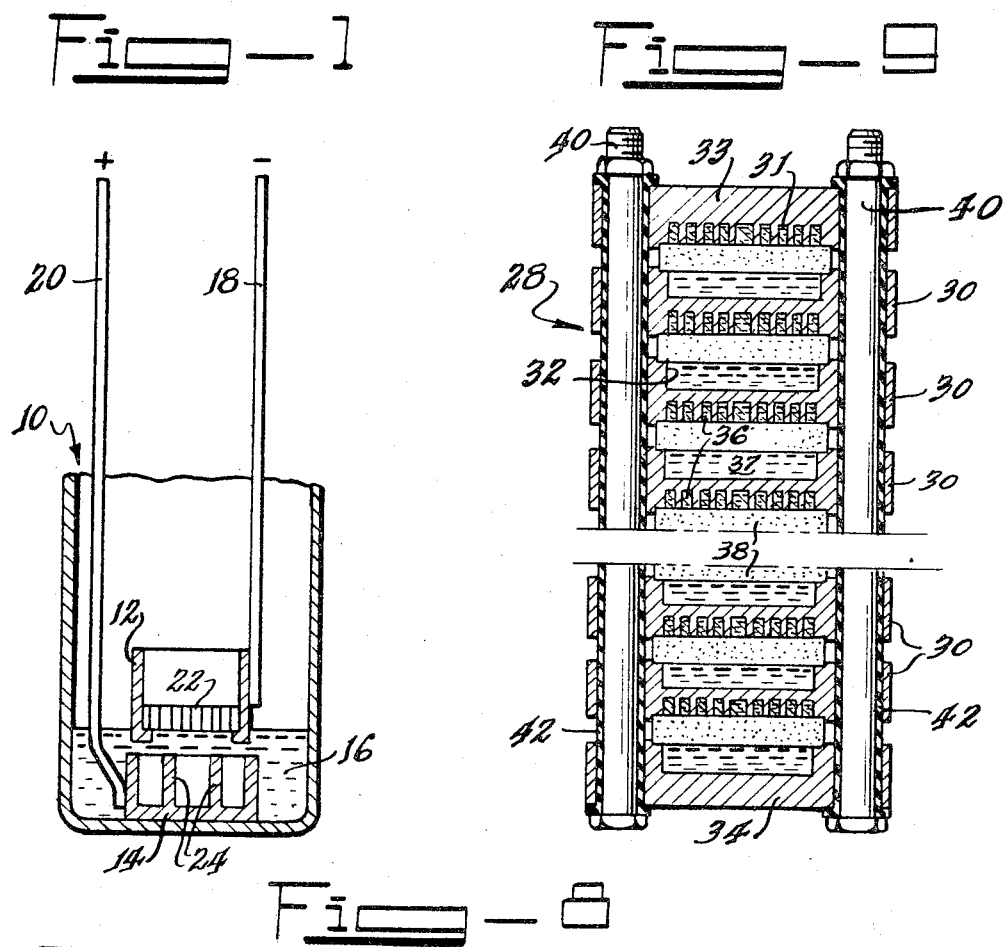
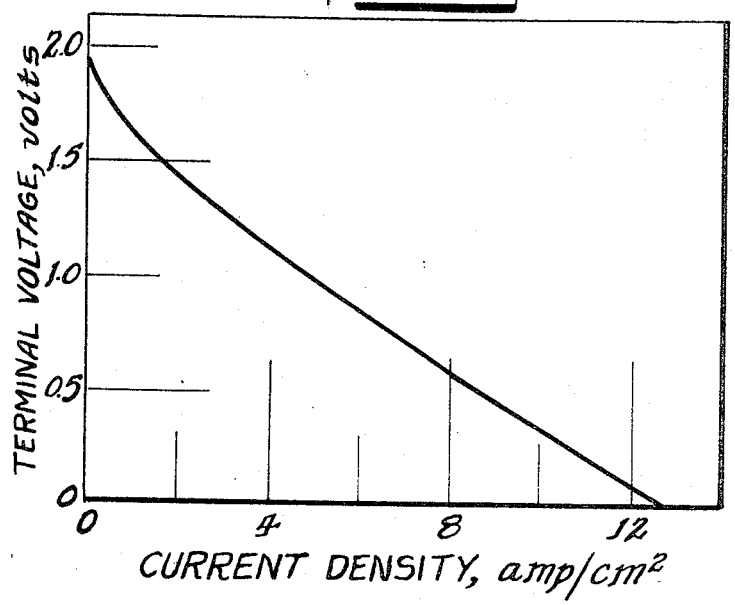

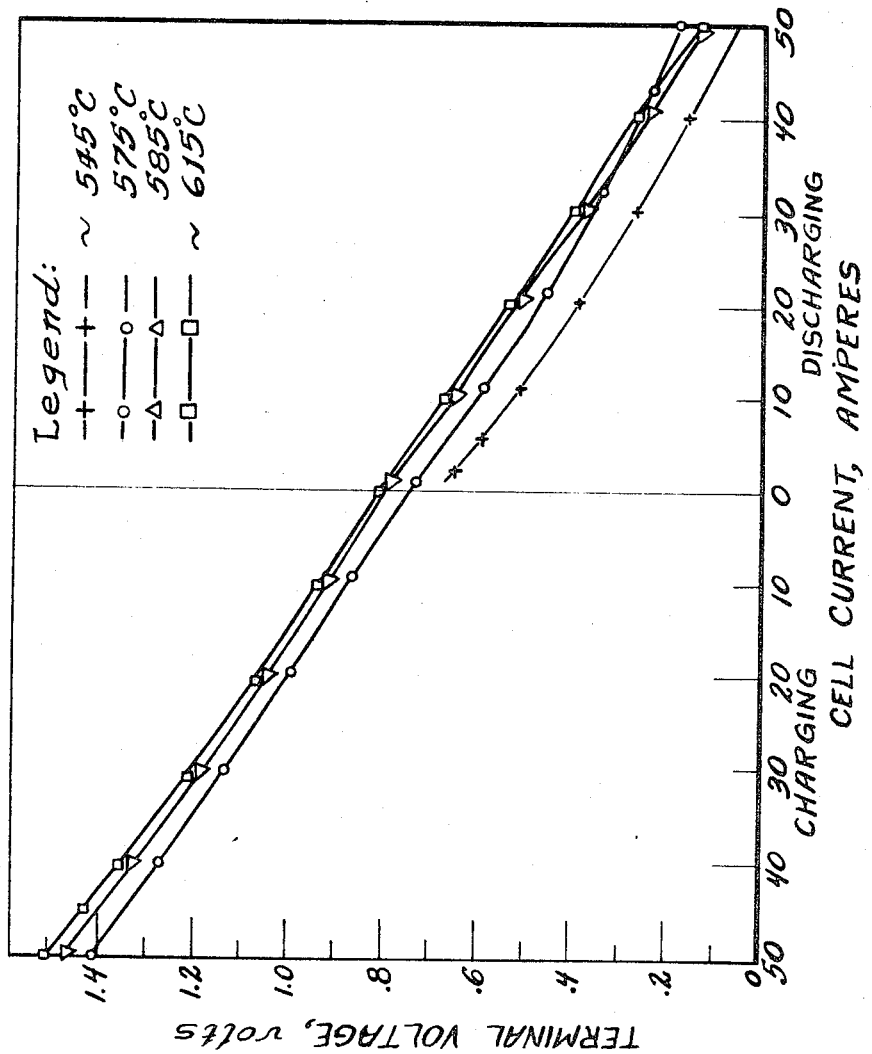

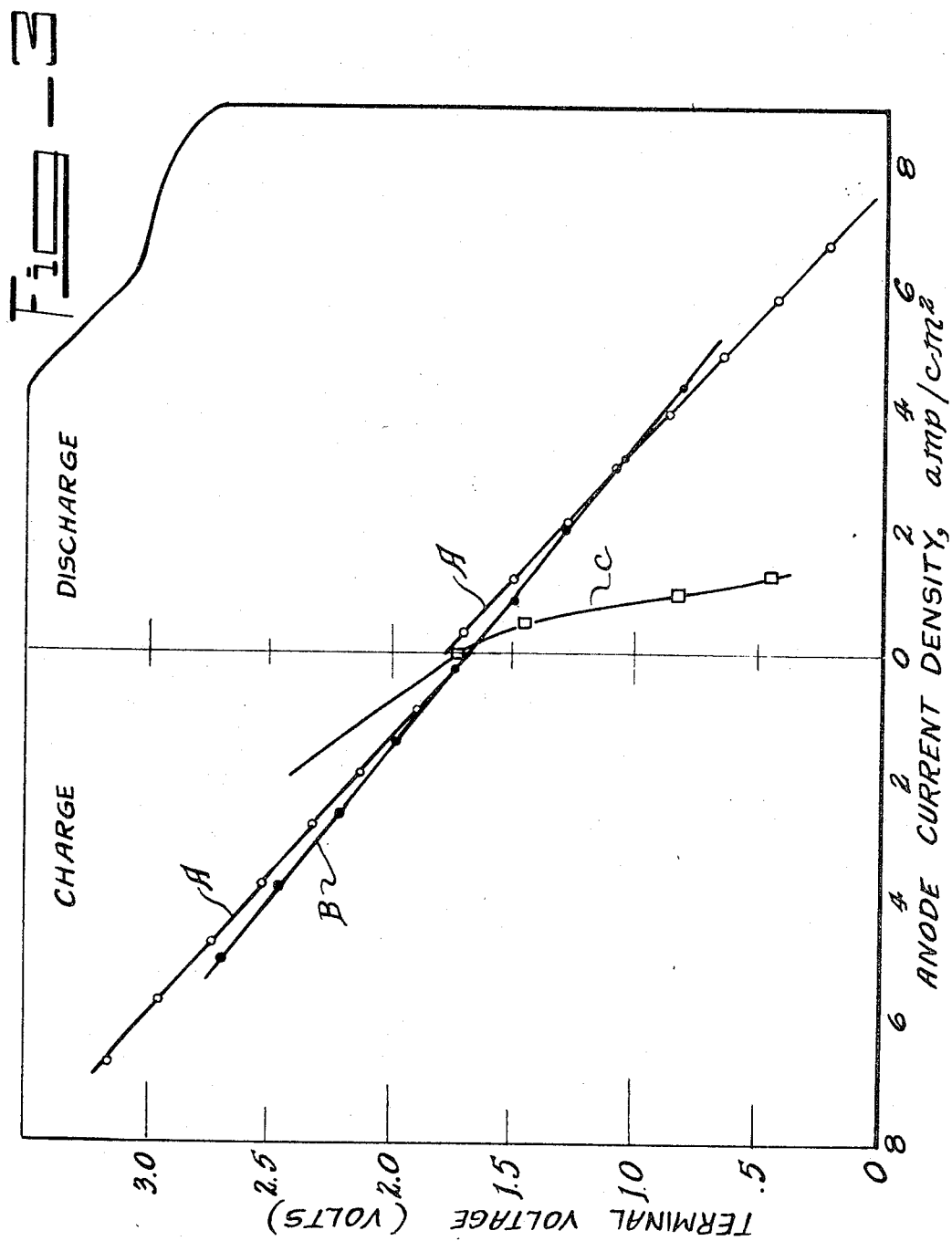

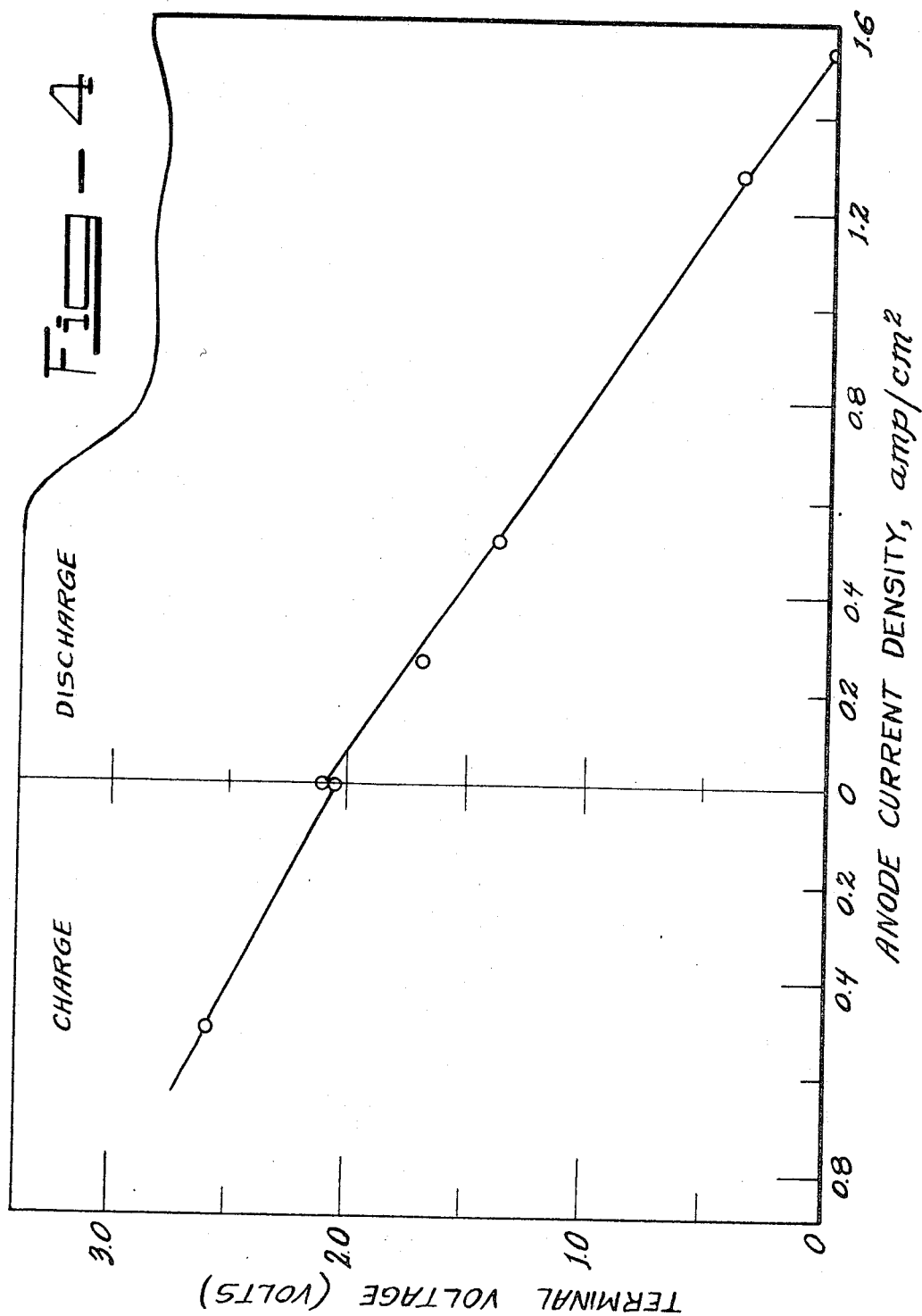

United States Patent Office 3,488,221
Patented Jan. 6, 1970

3,488,221
ELECTROCHEMICAL CELL
Hiroshi Shimotake, Hinsdale, Carl E. Johnson, Elk Grove, Melvin S. Foster, Naperville, and Elton J. Cairns, Downers Grove, Ill., assignors to the United States of America as represented by the United States Atomic Energy Commission
Filed Aug. 8, 1967, Ser. No. 659,570
Int. Cl. H01m 43/00
U.S. Cl. 136—20                                    15 Claims

ABSTRACT OF THE DISCLOSURE

An electrochemical power-producing cell comprised of an alkali metal anode and an electronegative cathode separated by a fused salt electrolyte. The anode current collector can be spirally shaped and the cathode current collector may contain metal filings, turnings, surfaces or the like.

CONTRACTUAL ORIGIN OF THE INVENTION

The invention described herein was made in the course of, or under, a contract with the United States Atomic Energy Commission.

BACKGROUND OF THE INVENTION

This invention relates to a device for storing electrical energy and more particularly to a cell in which the anode is an alkali metal and the electrolyte is a fused salt.

Typical cells in use today have severe limitations with regard to their specific power, specific energy, shelf life and number of charge-discharge cycles. Many of the above-mentioned limitations are solved by the cell of this invention which has an alkali metal anode, a fused salt electrolyte and a cathode selected from various electronegative elements. These cells have long shelf lives, may be completey and repeatedly charged and discharged at either rapid or slow rates without detriment to cell performance and can produce extremely high currents for short periods of time. They are versatile and may be used as constant voltage sources over long periods of time or as sources of large current for a short period of time.

The cell may be stored indefinitely when the constituent parts are in the solid state, but in order to produce electricity the anode, cathode and electrolyte must be molten. Under normal operating conditions, internal heat from the electrochemical reaction will be sufficient to maintain operating temperature, but while on standby an external heat source is needed to maintain proper temperature. The over-all cell reaction is the electrochemical transfer of the anode metal through the electrolyte to form an alloy with the cathode material. On recharge, the anode metal is electrochemically extracted from the cathode alloy and returned as free anode metal. The electrode reactions on discharge are:

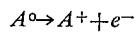

where $A^o$ is the anode metal and $C^o$ is the cathode material. When the cell is completely charged there is little or no anode metal in the cathode material. At complete discharge all the anode metal has transferred to the cathode material. Electrical energy is produced by the combined anode and cathode reactions, but, as might be expected, there are problems encountered in obtaining useful electrical energy from the cell.

It is desirable to operate the cell at the lowest possible temperature because higher temperatures result in increased corrosion and increased solubility of the anode metal in the electrolyte. The melting point of the cathode material or the fused salt electrolyte usually determines the minimum operating temperature, while the maximum operating temperature is generally determined by the above-mentioned considerations.

Cell performance depends to a large extent on the type of salt used as an electrolyte. The salt should have a low melting point, low electrolytic resistance and the anode metal should have a low solubility in the salt. In addition, the salt should be chemically inert to the anode and cathode. While other salts, such as hydroxides, carbonates, phosphates, sulfates, nitrites, cyanides, acetates, etc., are applicable, the preferred salts are halides.

In general, in order to minimize the operating temperatures of the cell, the eutectic composition is preferred to whatever salt system is chosen. Obviously, if the melting point of the cathode material is higher than the melting point of the salt eutectic, then other salt compositions may be used without raising the operating temperature of the cell. The electrolyte must contain some ions of the anode metal, and the following is a partial list of some binary and ternary eutectics which are applicable to the present invention.

| System: | Melting point, ° C. |
|---|---|
| NaI-NaCl | 572 |
| NaCl-NaF | 680 |
| NaF-NaI | 597 |
| NaI-NaCl-NaF | 535 |
| LiF-LiCl-LiI | 340 |
| LiF-LiCl-KCl | 346 |
| LiF-LiCl-KBr | 350 |
| LiF-LiCl-KI | 380 |
| LiF-LiI-KI | 281 |
| LiCl-LiI-KI | 264 |
| LiCl-KCl-RbCl | 265 |
| LiF-LiCl | 501 |
| LiF-LiI | 410 |
| LiF-KBr | 710 |
| LiCl-LiI | 368 |
| LiBr-KI | 323 |
| LiI-KI | 285 |

Internal resistance depends upon the electrolyte, the distance between electrodes and the shape of the electrode current collectors. The lower the internal resistance the greater the power output of the cell, so it is clear that minimal internal resistance is important. Fused salt electrolytes are preferred because they have higher conductivities than aqueous, organic or solid electrolytes and may be used in very thin layers between electrodes. A novel current collector which also greatly reduces internal resistance will be discussed later.

That the anodes and cathodes are molten during operation and the electrode reactions are reversible contributes greatly to the superior performance of this invention. In many prior art cells the anode has to be deposited on plates or in some other particular physical configuration when the cell is charged. The anode metal of this invention is molten during charging; therefore no difficulty is encountered in its redeposition. The molten condition of the anode metal and cathode material is important because very low overvoltages are encountered.

There are generally two types of overvoltages associated with chemical cells. Activation overvoltage results from a relatively slow electrochemical reaction at either electrode. The activation overvoltage may cause a sharp drop in the terminal voltage of the cell from the open circuit or zero current voltage when a small current is drawn. As will be shown, the cells of this invention do not suffer from an appreciable activation overvoltage. Concentration overvoltage in these cells may be caused by a buildup in anode metal concentration at the interface of the cathode and the electrolyte during discharge and may cause a sharp voltage drop at high current densities. In many prior art cells, even low current densities may result in significant concentration gradients between the anode, cathode or electrolyte which may cause large overvoltages. In the cell of the present invention, little if any concentration overvoltage occurs.

The lack of activation or concentration overvoltage results in an essentially linear current-voltage relationship. Low internal resistance because of the fused salt electrolyte, minimal interelectrode distance and specially designed current collectors result in high current densities. Current density is defined as the cell current divided by the anode area, and anode area is defined as the cross-sectional area of the anode in contact with the fused salt electrolyte. High current density is important, because in combination with the almost linear voltage-current relationship a high power density is achieved. The units of power density are watts per cm.$^2$, and high power densities in turn permit high specific power and specific energy. The units of specific power are watts per kilogram and the units of specific energy are watt hours per kilogram. As may readily be appreciated, these three quantities are extremely important in commercial cell or battery applications.

Cell capacity is calculated by the following equation:

$$\text{Cell capacity} = \frac{\text{Anode metal (gms.)}}{\text{atomic wt.}} \times$$

$$\frac{\text{equivalents}}{\text{mole}} \times \text{Faraday} = \text{Anode metal (mole)} \times$$

$$\frac{\text{equivalents}}{\text{mole}} \times 96{,}500 \frac{\text{coulombs}}{\text{equivalent}} \times \frac{\text{amp.-sec.}}{\text{coulombs}} =$$

$$\text{amp.-sec.} \times \frac{\text{hr.}}{3600 \text{ sec.}} = \text{amp.-hr.}$$

As may readily be seen, cell capacity depends upon the amount and type of anode metal used in each cell. With a lithium anode, cell capacity is 3.89 amp-hours per gram of lithium, while for sodium, capacity is 1.17 amp-hours per gram. Since many cathode materials form either intermetallic or chemical compounds with the anode metal, the amount of anode metal in each cell is limited by the type and amount of cathode material in the cell.

Many different combinations of anode metals and cathode materials may be selected. Anode metals of sodium and lithium and electronegative cathode materials of tellurium, selenium, bismuth, cadmium, tin, zinc and lead have been used, while sulfur, antimony, phosphorus, arsenic, thallium, indium, gallium and aluminum may also be chosen for cathode materials. Each anode-cathode combination has to be examined for any solid compound which can form and precipitate. Some examples of solid compounds or intermetallics that form between the above-named anode metals and cathode materials follow. For instance, an alloy of 75 a/o sodium —25 a/o bismuth forms an intermetallic compound at 550° C. In a sodium-bismuth cell operating at about 550° C., the amount of anode and cathode materials must be adjusted so that at full discharge the cathode contains less than 75 a/o sodium in bismuth, in order to prevent the precipitation of solid $Na_3Bi$. Similarly, 66 a/o lithium —34 a/o tellurium alloy forms a solid intermetallic compound at 480° C. In a lithium-tellurium cell operating at about 480° C., the amount of cathode and anode materials must be adjusted so that at full discharge the cathode is less than 66 a/o in lithium.

BRIEF DESCRIPTION OF THE DRAWINGS

The interrelationships of the different parameters discussed above and the physical configuration of the cells may better understood by reference to the following figures in which:

FIG. 1 is a schematic of the cell of this invention.

FIG. 2 is a graph of the steady-state voltage-current characteristics for a sodium-bismuth cell.

FIG. 3 is a graph of the steady-state voltage-current characteristics for a lithium-tellurium cell.

FIG. 4 is a graph of the steady-state voltage-current characteristics for a lithium-selenium cell.

FIG. 8 is a graph of the short-time voltage-current characteristics for a lithium-tellurium cell.

FIG. 9 is a view in section of a set of cells arranged in series.

DESCRIPTION OF THE PREFERRED EMBODIMENT

Figure 5:
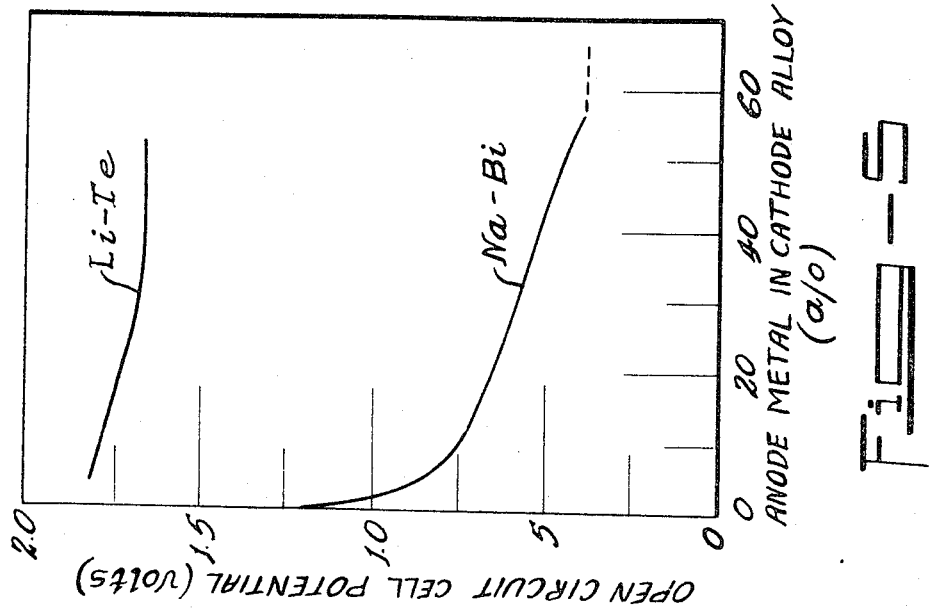
FIG. 5 is a graph of the change in open-circuit voltage with a change in cathode composition for a sodium-bismuth and a lithium-tellurium cell.

With reference to FIG. 1, cell 10 consists of an anode current collector 12 and a cathode current collector 14 separated by a fused salt electrolyte 16. Electrical leads 18 and 20 are attached to the anode current collector 12 and the cathode current collector 14, respectively. Current collectors 12 and 14 may be made out of any electrically conducting substance, but they must be chemically inert to whatever materials they contact. If the anode is an alkali metal, then collector 12 may be stainless steel. If the cathode is bismuth or lead, then collector 14 may also be stainless steel. As tellurium reacts with stainless steel, a material inert to tellurium should be used for collector 14 if tellurium is used as a cathode material; one acceptable substitute for stainless steel is pure iron.

Anode current collector 12 is a hollow cylindrical housing and contains anode metal (not shown). The height of collector 12 may vary but it must be at least as high as the level of anode metal in cell 10. Since electricity is produced by the interaction of anode metal, cathode material and fused salt electrolyte 16, the anode current collector 12 or an extension thereof must be in contact with electrolyte 16.

During discharge, anode metal transfers into electrolyte 16 as ions, thereby lowering the liquid level in collector 12. Electrons given up by the anode metal are collected by collector 12. As the anode metal is depleted, surface tension forces in the metal become insufficient to prevent it from breaking into small globules which decrease the current-collecting efficiency of collector 12. The metal breakup results in increased internal resistance and a decrease in power density, specific power and specific energy. Various devices, such as grids, perforated plates and metal sponges, have been employed to improve the current-collecting characteristics of collector 12. It was found that all of the aforementioned devices worked to varying degrees, but none of them was satisfactory.

Anode current collector 12 of the present invention includes a spiral 22 which is an electrical conductor and is electrically connected to collector 12. Spiral 22 has been made from various materials, such as stainless steel, iron and tantalum. Spiral 22 may be bolted, welded, or in any other manner connected to collector 12 as long as good electrical contact is established. Spiral 22 as an extension of collector 12 must contact electrolyte 16. For an anode current collector 12 with a 3-inch diameter, a spiral 22 $\frac{1}{16}$ inch in thickness, $\frac{1}{2}$ inch in height with 10 turns was used. The height of spiral 22 is not critical, except if space and weight are important, then the amount of anode metal present will determine the height of spiral 22. Spiral 22 may be fitted on its top with a rod or x-shaped support member (not shown) in order to prevent sagging. A top plate (not shown) may also be used with spiral 22 as a support and to improve current-collecting efficiency.

While it has been found that spiral 22 produces unexpected superior results to any of the aforementioned devices, the precise reasons are not known. It is believed that the superiority of the spiral is due in part to the fact that with it a maximum amount of anode metal is in contact with electrolyte 16, while at the same time spiral 22 prevents breakup of the anode metal and increases the electrical conducting area in contact with the anode metal. At this time it is not possible to mathematically calculate for each anode the precise number of turns per spiral which will produce the most efficient current collector. A relatively small number of experiments is necessary in order to determine the best current collector for each anode metal and size.

The electrical resistivity of materials used as cathode metals varies enormously. For instance, the resistivity of bismuth at 0° C. is about $1.07 \times 10^{-4}$ ohms-cm. and lead at 20° C. is about $20 \times 10^{-6}$, while tellurium and selenium are much poorer conductors. It is clear that a single design for cathode current collector 14 will not suffice for these various elements. It has been found that additional electrical conducting surfaces are needed as a part of the cathode current collector 14 when comparatively poor electrical conductors, such as tellurium and, to a much larger degree, selenium, are used as cathodes. To this end, concentric rings 24 are employed in cathode current collector 14 for certain cathodes, as well as metal turnings and filings (not shown).

The difference between the function of spiral 22 and concentric rings 24 or the metal turnings or filings is that many anode metals are good electrical conductors, so increased conducting surface is not usually a prime requirement of spiral 22. Spiral 22 prevents breakup of the anode metal but at the same time does not interfere with maximum contact between electrolyte 16 and the anode metal. Maximum contact is important because it is that contact which results in the discharge reaction hereinbefore described. Concentric rings 24 provide electrical conducting surface in order to enhance current flow in the cathode. Metal breakup is not a consideration in the cathode, since metal volume increases during discharge. During recharge anode metal leaves the cathode, but the original amount of cathode material always stays in cathode current collector 14. Because the amount of electrical conducting surface is important in collector 14, any configuration, such as a spiral, metal turnings or filings, which does not interfere with the transfer of anode metal from electrolyte 16 is acceptable. It will be shown later, however, that metal turnings are superior to all other devices. Most of the experiments to be described hereafter were performed in a device substantially as shown in FIG. 1.

FIGS. 2, 3 and 4 generally show steady-state voltage-current characteristics of sodium-bismuth, lithium-tellurium and lithium selenium cells. The data were determined by starting at fully charged or discharged conditions and varying circuit resistance to obtain a particular current. Voltage was measured at about 20 a/o anode metal in the cathode material. In all cases, charging was terminated before the open-circuit voltage exceeded the decomposition voltage of the electrolyte.

FIG. 2 shows the current-voltage characteristics for a sodium-bismuth cell. The electrolyte consisted of 53.2 m/o sodium iodide, 31.6 m/o sodium chloride and 15.2 m/o sodium fluoride and had a melting point of 535° C. The electrolyte thickness was 0.38 cm. and the anode area was 45 cm.² The voltage-current characteristics were determined for various temperatures between 535° C. and 615° C. and the curves in FIG. 2 are representative thereof. As may be seen from the figure, the curves are essentially linear with only slight deviations at extremely heavy currents. While voltage increased with higher temperatures, the increase was slight. Open-circuit (zero current) voltage increased only 0.12 volt for an increase of 70 degrees from 545° C. to 615° C.

FIG. 3 shows the current-voltage characteristics for three lithium-tellurium cells. The measured open-circuit voltage was between 1.7 and 1.8 volts and the electrolyte in each instance consisted of 13 m/o lithium fluoride, 30 m/o lithium chloride and 57 m/o lithium iodide with a melting point of about 340° C. The melting point of tellurium is 449.8° C., which determined the minimum temperature at which the cell could be operated. The cell was tested over temperatures between 467° C. to 500° C. The data shown in FIG. 3 were determined at about 470° C. All three cells had an interelectrode distance of about 0.5 cm., and the cells represented by curves A and B were equipped with a spiral anode current collector, while the cell represented by curve C was equipped with a metal sponge current collector. The anode area for cells A and C was 3.9 cm.², while for cell B the anode area was 10 cm.² The cathode area in all cases was 10 cm.²

As may be seen in the figure, curves A and B are essentially linear so that variation in anode area produced no significant change in behavior at the cathode. The slopes of all three curves in FIG. 3, as well as those in FIGS. 2 and 4, represent the internal resistance of the cells. As may be seen from the difference in curves A and B, the greater the thickness of the electrolyte, the greater the internal resistance of the cell. The marked difference between the slope of curve C and the slopes of curves A and B is due in a large part to the difference in the anode current collectors of the cells. Cells A and C were similar in most respects except for the current collectors. It is clearly seen from a comparison of the slope and shape of the two curves that the spiral current collector reduces the internal resistance of the cell by a significant factor and thereby improves the voltage-current characteristics. It is believed, but not relied upon, that one difference between the performance of the sponge and the spiral current collector is that water as an impurity in the electrolyte reacts to form a gas which collects in the sponge and disrupts its current-collecting function, while the spiral collector allows any gas formed to escape. It should be noted from FIG. 3 that current densities of greater than 7 amps/cm.² were obtained on both charge and discharge, which indicates that the cell can be charged in 15 minutes or less.

FIG. 4 shows the current-voltage characteristics for a lithium-selenium cell. The above-mentioned lithium fluoride—lithium chloride—lithium iodide eutectic was employed in this cell. The interelectrode distance was 0.5 cm. and the anode area was 3.9 cm.² The cell was operated at about 342° C. It is seen from the figure that the curves are linear and that high current densities may be employed on charging. Of special note is the reduced temperature at which this cell operates in comparison with the lithium-tellurium and sodium-bismuth cells, which is due in part to the lower melting point of selenium, about 248° C. Two of the principal advantages of a lithium-selenium cell are the lower melting point of selenium and low equivalent weight as compared to other cathode materials. Mitigating the above advantages is the poor conductivity of selenium; however, the use of metal fillings or turnings in the cathode drastically improved conductivity. Table I presents data for a lithium-selenium cell operated at a temperature of 362° C., having a cathode area of 10 cm.², an anode area of 3.9 cm.² and an interelectrode distance of 0.48 cm. The selenium cathode contained iron filings. Table II presents data from another lithium-selenium cell similar to that of Table I but operated at 353° C. and with iron turnings instead of filings in the selenium cathode. As may be sen from a comparison of FIG. 4 with Tables I and II the current densities of Table II are far improved over FIG. 4 and Table I. For instance, at about 1.00 volt the current density is over 2.35 amps/cm.$^2$ in Table II, in FIG. 4 the current density is about 0.8 amp/cm.$^2$ and in Table I the current density is about 1.86 amp/cm.$^2$ for 1.06 volts.

TABLE I

| Cell voltage, Volts: | Anode current Density, a./cm.$^2$ |
|---|---|
| 2.14 | 0 |
| 2.09 | 0.128 |
| 1.96 | 0.372 |
| 1.86 | 0.513 |
| 1.60 | 1.09 |
| 1.78 | 0.692 |
| 1.51 | 1.20 |

| Cell voltage, Volts: | Anode current Density, a./cm.$^2$ |
|---|---|
| 1.43 | 1.18 |
| 1.54 | 1.33 |
| 1.38 | 1.28 |
| 1.34 | 1.44 |
| 1.36 | 1.51 |
| 1.37 | 1.59 |
| 1.26 | 1.49 |
| 1.21 | 1.59 |
| 1.06 | 1.86 |
| 0.80 | 2.12 |
| 0.63 | 2.38 |
| 0.36 | 2.62 |
| 0.45 | 2.62 |
| 0.08 | 2.74 |
| 0 | 2.77 |
| 2.08 | 0 |

TABLE II

| Cell voltage, Volts: | Anode current Density, a./cm.$^2$ |
|---|---|
| 2.04 | 0 |
| 1.99 | 0.128 |
| 1.96 | 0.205 |
| 1.89 | 0.359 |
| 1.81 | 0.551 |
| 1.57 | 1.128 |
| 1.73 | 0.718 |
| 1.70 | 0.795 |
| 1.55 | 1.15 |
| 1.49 | 1.31 |
| 1.40 | 1.54 |
| 1.36 | 1.62 |
| 1.32 | 1.68 |
| 1.10 | 2.14 |
| 1.24 | 1.91 |
| 1.00 | 2.37 |
| 1.04 | 2.23 |
| 0.90 | 2.53 |
| 0.88 | 2.63 |
| 0.40 | 3.10 |
| 0.38 | 3.26 |

These data show that, while various devices may be used in the cathode material to improve the conductivity, metal turnings seem to be superior. Metal sponges are also capable of improving conductivity in the cathode where gas collection from the electrolyte will not be a problem.

Since the anode metal migrates to the cathode during discharge, an important cell characteristic is the variation in open-circuit voltage with a change in cathode composition. FIG. 5 shows how the open-circuit voltage varies with a change in cathode composition for both a sodium-bismuth and a lithium-tellurium cell. It is clearly seen from the figure that the lithium-tellurium cell is superior to the sodium-bismuth cell as a constant voltage source. At a 50% anode-cathode composition the lithium-tellurium cell had decreased about 0.15 volt or about 8.3% of its open-circuit voltage, while the sodium-bismuth cell had decreased about 0.7 volt or about 58% of its open-circuit voltage. Cell open-circuit voltage is affected not only by a change in cathode composition but also by self-discharge.

Self-discharge is defined as a transfer of anode material to the cathode at zero current or open-circuit conditions. This results in a loss of potential without any corresponding production of electricity. The anode metal generally has some solubility in the electrolyte and can migrate to the cathode, even if no current is flowing, when the cell constituents are molten. A significant decrease in voltage or capacity due to self-discharge could seriously affect the usefulness of the cell. Lithium cells are better than sodium with respect to self-discharge because lithium is less soluble in lithium halides than is sodium in sodium halides.

Figure 6:
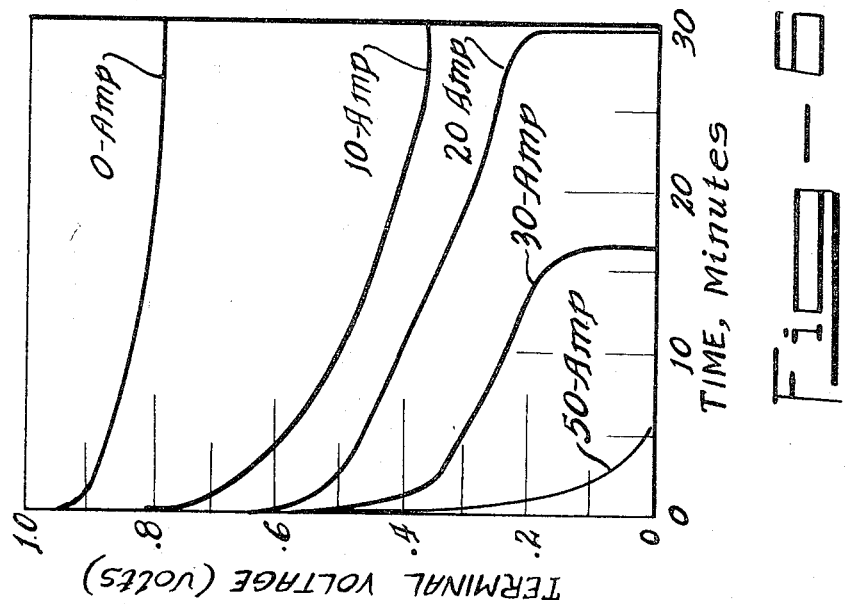
FIG. 6 is a graph of the change in voltage with time for constant-current discharge of a sodium-bismuth cell.
Figure 7:
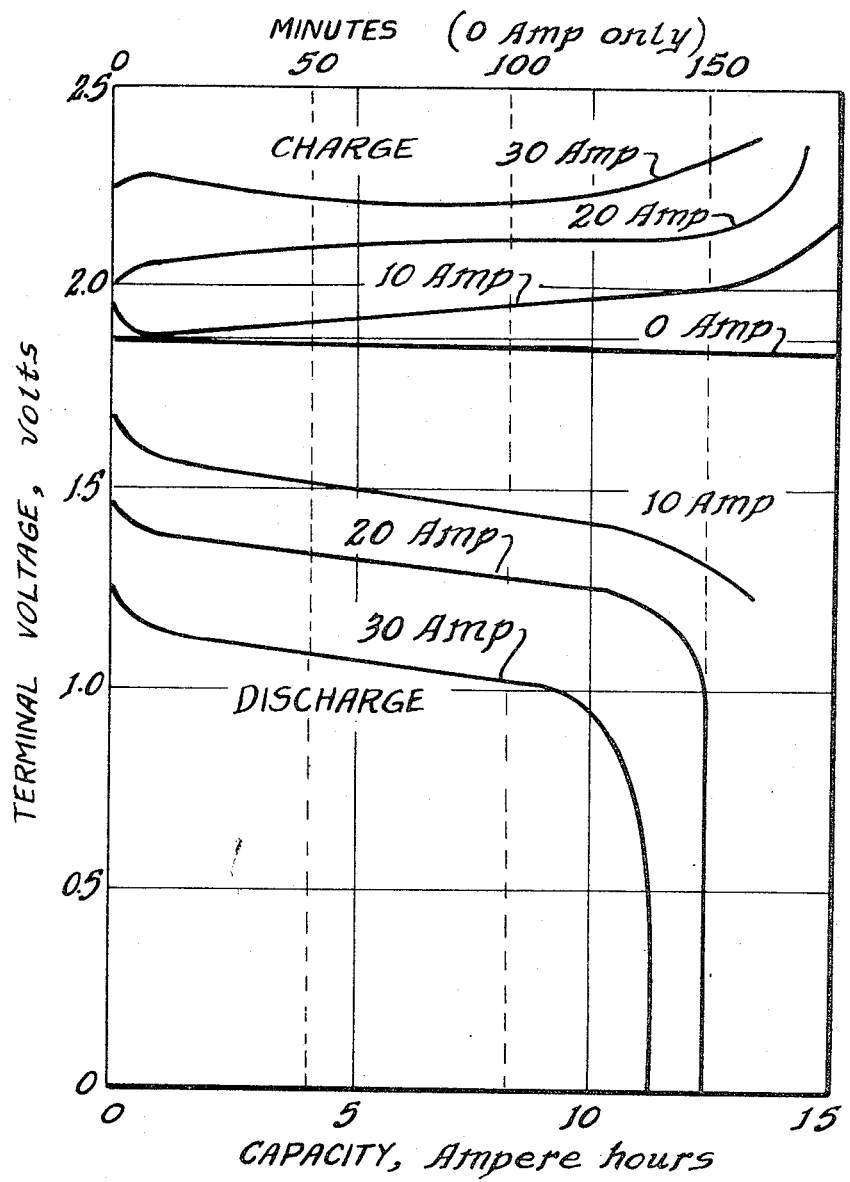
FIG. 7 is a graph of the change in voltage with time for constant-current charge and discharge of a lithium-tellurium cell.

FIGS. 6 and 7 show constant-current discharge curves and FIG. 7 in addition shows constant-current charge curves. The data for these curves were obtained by varying the load resistance as the cell voltage dropped in order to maintain a constant current. FIG. 6 represents constant-current curves for the sodium-bismuth cell hereinbefore described and FIG. 7 represents constant-current curves for the lithium-tellurium cell with a 10 cm.$^2$ anode hereinbefore described. The zero amperage or open-circuit voltage readings are a measure of self-discharge. The lithium-tellurium cell incurs far less self-discharge over a given period of time than does the sodium-bismuth cell and is far superior in this aspect.

The cells subjected to the experiments reported in FIGS. 6 and 7 were completely discharged when the terminal voltage dropped to zero. Constant-voltage characteristics are important for many uses. For the sodium-bismuth cell of FIG. 6, a 30 amp current drawn for 15 minutes resulted in a decrease in voltage from the open-circuit value of about 0.58 volt to about 0.19 volt. The voltage drop was 0.39 volt or about 67% of the open-circuit value. For the lithium-tellurium cell of FIG. 7, a 30 amp current drawn for 18 minutes resulted in a decrease in voltage of about 0.25 volt or about 20% of the open-circuit value. The length of time it takes for a cell to become completely discharged depends upon the cell capacity and the rate of discharge, but it is clear from the above calculations and FIGS. 6 and 7 that lithium-tellurium cells are better constant-voltage sources than are sodium-bismuth cells.

FIG. 7 also shows constant-current curves during charge. It is seen that the lithium-tellurium cell can accept a comparatively high 30-ampere charge for over 20 minutes without any significant overvoltage. While constant voltage is important during discharge, it is also important during charge because overvoltages which may result in electrolysis of the electrolyte must be avoided.

The most efficient charging currents were from about 5 to 10 amperes which resulted in about 98% charge of the cell after 111 minutes for the 5-ampere charge and 55 minutes for the 10-ampere charge. At higher charge rates of over 30 amperes, the cell was about 70% charged when cell voltage increased sharply. The sharp increase of the overvoltage was attributed to the rapid depletion of lithium from the tellurium-electrolyte interface. Depletion occurred because the lithium diffusion rate from the tellurium liquid to the interface is slower than from the interface into the electrolyte. In order to obtain a nearly 100% charge, lower current should be used, or the cell may stand at open circuit for a short time in order to allow the buildup of lithium concentration at the tellurium-electrolyte interface.

FIG. 8 is a short-time voltage-current curve for the lithium-tellurium cell described in FIG. 7. The data were obtained by fully charging the cell before each data point was taken; the voltage readings were taken within one minute after the start of discharge and correspond to about 5% lithium in the cathode. A maximum current density of 12.7 amps/cm.$^2$ was observed and a power density of 4.9 watts/cm.$^2$ was obtained at 0.7 volt. The maximum temperature rise during high current density discharges was 30° C.

The data in FIG. 8 show the high power density deliverable by a lithium-tellurium cell. The constant-voltage characteristics, as shown in FIG. 7, high current density, as shown in FIG. 3, and high power density make the lithium-tellurium cell a superior and versatile performer. So, too, the lithium-selenium cell has specific advantages. The open-circuit voltage of the lithium-selenium cell is greater than the lithium-tellurium cell, but the selenium power densities are not as great. The equivalent weight of selenium is only 78.96 grams per gram atom as compared to 127.60 grams per gram atom for tellurium. Obviously, improved specific energy, that is, watts per gram of cell weight, for a selenium cell over a tellurium cell is possible. Whether a sodium-bismuth, lithium-tellurium, lithium-selenium, sodium-lead or some other combination of anode and cathode materials within the scope of this invention are utilized, in many commercial applications, the cells may have to be linked in series to produce greater voltages as required. When individual cells are linked in series the combination may be termed a battery.

FIG. 9 shows a plurality of cells 28 in series to form a battery. Each internal member 30 is cylindrically chaped with a chamber on each side to form therein both an anode current collector 31 and a cathode current collector 32. End members 33 and 34 have one chamber each and act only as an anode collector 31 and cathode collector 32, respectively. Each anode collector 31 contains a spiral which houses anode metal 36. The spiral configuration, as explained before, improves the current-collecting efficiency upon discharge. Each cathode collector 32 may contain additional current-collecting surfaces if cathode material 37 so requires.

Electrolyte 38 located intermediate each anode 31 and cathode 32 should be immobilized in order for the battery to be usable in a variety of positions. Immobilization may be accomplished by at least two methods. Electrolyte 38 may be in the form of a paste. The paste may be various ceramic particles and the electrolytic salt. A powder ceramic, such as lithium aluminate, has been successfully used. The volume percent of the ceramic particles in the paste depends upon the particle size and desired viscosity.

Electrolyte 38 may also be immobilized by soaking a porous ceramic disc in the chosen salt. Since the internal resistance of the battery depends to some extent on the thickness of electrolyte 38, discs of about 1 to 5 mm. in thickness have been used. Whichever immobilization method is used, electrolyte 38 acts as a hot seal between each cathode 32 and anode 31 during battery operation. During battery operation, each internal member 30 is bipolar in that the cathode collector 32 imparts a positive charge thereto, while the anode collector 31 imparts a negative charge. Current may be drawn from series 28 by means of electrical leads (not shown) from end members 33 and 34.

Members 30, 33 and 34 are secured by nuts and bolts 40 and insulated therefrom by insulation 42. The entire set of cells 28 may be covered with insulation (not shown) if desired.

It is not possible to include all data accumulated in the experiments conducted with all the anode and cathode materials. The foregoing description is not all inclusive, but is meant to be taken as representative only. A definitive statement of the invention is contained in the appended claims.

The embodiments of the invention in which an exclusive property or privilege is claimed are defined as follows:

1. In an electrochemical power-producing cell comprising a molten-alkali-metal anode in contact with an anode current collector, a molten-electronegative-element cathode in contact with a cathode current collector, and a molten fused salt electrolyte containing ions of the anode metal separating said anode and cathode, the improvement wherein said anode current collector consists of a hollow cylindrical housing containing the anode metal and a spiral-shaped metal band electrically connected to the hollow cylindrical housing and in contact with the electrolyte and the anode metal.

2. The improvement of claim 1 wherein the anode is sodium or lithium and the cathode is selected from the electronegative group consisting of bismuth, lead, sulfur, phosphorus, tin, antimony, arsenic, thallium, indium, gallium, aluminum, zinc, cadmium, tellurium, selenium and mixtures thereof.

3. The improvement of claim 1 wherein the anode is lithium, the cathode is selenium, tellurium or a mixture thereof and the electrolyte is a halide.

4. The improvement of claim 1 wherein the anode is lithium, the cathode is tellurium and the electrolyte is lithium fluoride—lithium chloride—lithium iodide.

5. The improvement of claim 1 wherein the anode current collector is three inches in diameter and the spiral band is $\frac{1}{16}$ inch in thickness and $\frac{1}{2}$ inch wide, there being 10 turns therein.

6. A cell comprising: an anode consisting of a molten alkali metal; spiral means electrically connected to a hollow current collector containing said anode for collecting current therefrom and for preventing molten metal breakup during cell discharge; a cathode comprised of a molten electronegative element; means for collecting current from said cathode; and a molten fused salt electrolyte containing ions of the alkali metal anode, said electrolyte being disposed between said anode and said cathode.

7. The cell of claim 6 wherein the means for collecting current from said cathode comprises a container for said cathode, said container having therein a plurality of electrical conducting surfaces.

8. The cell of claim 6 wherein the cathode is selected from the electronegative group consisting of bismuth, lead, sulfur, phosphorus, tin, antimony, arsenic, thallium, indium, gallium, aluminum, zinc, cadmium, tellurium, selenium and mixtures thereof.

9. The cell of claim 8 wherein the anode is lithium, the cathode is tellurium, selenium or mixtures thereof and the electrolyte includes lithium halides.

10. The cell of claim 8 wherein the electrolyte is a halide, and further comprising means for rendering said electrolyte essentially immobile between said anode and said cathode.

11. The cell of claim 10 wherein the means for rendering the electrolyte essentially immobile comprises a porous ceramic member saturated with said electrolyte.

12. The cell of claim 11 wherein said cathode container has a plurality of metal turnings or filings therein, the anode is lithium and the electrolyte is comprised of lithium fluoride—lithium chloride—lithium iodide.

13. The cell of claim 12 wherein the cathode is tellurium and a plurality of anodes and cathodes each separated by an electrolyte are connected is series.

14. The cell of claim 13 wherein the spiral associated with each anode is the same height as the anode metal when the cell is fully charged.

15. The cell of claim 14 wherein said spiral is made of stainless steel, iron or tantalum and contains about 5 to 15 turns for each 3 inches in diameter.

(References on following page)

References Cited

UNITED STATES PATENTS

| | | | |
|---|---|---|---|
| 2,081,926 | 6/1937 | Gyuris | 136—83.1 |
| 2,102,701 | 12/1937 | Gyuris | 136—83.1 |
| 2,384,463 | 9/1945 | Gunn et al. | 136—86 |
| 3,031,518 | 4/1962 | Werner et al. | |
| 3,119,723 | 1/1964 | Crouthamel et al. | |
| 3,238,437 | 3/1966 | Foster et al. | 136—83 |
| 3,245,836 | 4/1966 | Agruss | 136—83 |
| 3,357,862 | 12/1967 | Greenberg et al. | 136—83.1 |
| 3,367,800 | 2/1968 | Panzer | 136—83 |

WINSTON A. DOUGLAS, Primary Examiner

C. F. LEFEVOUR, Assistant Examiner

U.S. Cl. X.R.

136—6, 24, 26, 30, 86